US007951238B2

(12) United States Patent
Deneuvillers et al.

(10) Patent No.: US 7,951,238 B2
(45) Date of Patent: May 31, 2011

(54) METHOD FOR PREPARING FATTY ACID ESTERS OF NATURAL ORIGIN FUNCTIONALIZED BY OXIDATION FOR USE AS FLUXING OILS FOR BITUMEN

(75) Inventors: Christine Deneuvillers, Chatenay Malabry (FR); Lê Chiên Hoang, Nouaille Maupertuis (FR)

(73) Assignees: Colas, Boulogne-Billancourt (FR); Valagro, Centre de Valorisation Industrielle des Agroressources, Poitiers (FR)

( * ) Notice: Subject to any disclaimer, the term of this patent is extended or adjusted under 35 U.S.C. 154(b) by 525 days.

(21) Appl. No.: 12/089,955

(22) PCT Filed: Oct. 10, 2006

(86) PCT No.: PCT/FR2006/051012
§ 371 (c)(1),
(2), (4) Date: Apr. 11, 2008

(87) PCT Pub. No.: WO2007/042726
PCT Pub. Date: Apr. 19, 2007

(65) Prior Publication Data
US 2008/0250975 A1 Oct. 16, 2008

(30) Foreign Application Priority Data
Oct. 11, 2005 (FR) ...................... 05 53086

(51) Int. Cl.
*C09D 195/00* (2006.01)
*C09D 191/00* (2006.01)

(52) U.S. Cl. ......... 106/243; 106/269; 106/279; 106/280

(58) Field of Classification Search ............... 106/243, 106/269, 279, 280
See application file for complete search history.

(56) References Cited

U.S. PATENT DOCUMENTS

| 2,403,408 | A | | 7/1946 | Stamberger | |
| 2,418,452 | A | | 4/1947 | Auer | |
| 5,885,946 | A | * | 3/1999 | Lamsa | 508/485 |
| 6,156,113 | A | * | 12/2000 | Pasquier | 106/269 |
| 6,680,394 | B1 | * | 1/2004 | Brumm et al. | 554/27 |

FOREIGN PATENT DOCUMENTS

FR 2 768 150 A 3/1999
WO WO2006111997 A1 * 10/2006

OTHER PUBLICATIONS

Bondioli et al, "Storage Stability of Biodiesel", JAOCS, vol. 72, No. 6, (1995).*
Sendzikiene et al, "Oxidation Stability of Biodiesel Fuel Produced from Fatty Wastes", Polish Journal of Environmental Studies, vol. 14, No. 3, (2005), pp. 335-339.*

* cited by examiner

*Primary Examiner* — David M Brunsman
(74) *Attorney, Agent, or Firm* — Young & Thompson

(57) ABSTRACT

A method for preparing a fluxing oil, having an iodine number ranging from 50 to 200, based on fatty substances of natural origin having been chemically functionalized by oxidation, includes the steps of: i) providing a fatty substance or a mixture of fatty substances of natural origin, ii) subjecting the fatty substance or the mixture of fatty substances of natural origin to at least one transesterification or esterification reaction by at least one alkanol or mono-alcohol, iii) subjecting the compound or mixture of compounds obtained at step ii) to at least one chemical functionalization reaction by oxidation introducing at least one functional group selected from carboxylic acid, epoxy, peroxide, aldehyde, ether, ester, alcohol and ketone groups, and iv) collecting the fluxing oil.

21 Claims, No Drawings

METHOD FOR PREPARING FATTY ACID ESTERS OF NATURAL ORIGIN FUNCTIONALIZED BY OXIDATION FOR USE AS FLUXING OILS FOR BITUMEN

This application is a 371 of PCT/FR2006/051012, filed Oct. 10, 2006.

BACKGROUND OF THE INVENTION

1. Field of the Invention

The field of the present invention relates to the preparation of fluxed bitumen-based binders mostly used for making road surface layers and/or road pavements and/or for civil engineering applications, and more particularly to the preparation of fluxing oils forming part of the composition of such binders by chemically modifying fatty substances of natural origin.

2. Description of the Related Art

The bitumen is the main hydrocarbon binder used in the field of road works and civil engineering. It may be used either pure or modified by polymer additions, where it is then called modified bitumen.

Bitumen used in road binders is excessively viscous at room temperature to be suitably handled or to have an adapted wettability as regards aggregates.

There are several means for making bitumen or modified bitumen handleable: it may be either heated depending on its viscosity, or brought in emulsion, or its viscosity may be reduced by mixing with solvents or "fluxing oils". Most of these fluxing oils are derived from petroleum.

The bitumen recovers its initial properties, once in use, whatever the technique employed, respectively by cooling, by evaporating the water from emulsion or by evaporating the solvent. The latter alternative as a consequence causes volatile organic compounds to be released in the atmosphere, which is harmful to the environment and represents a wastage of the fossil energy.

Using fluxing agents, also called fluxing oils, based on vegetable and/or animal fatty substances (oils and fats) was already known, to thus prevent any volatile organic compound (VOCs) emission.

In general, raw fatty substances of natural origin have a good solvency for bitumen. On the contrary, they are highly viscous, which may be reduced by converting triglycerides into monoesters.

The French patent application FR 2 721 043 (VIALIT) describes a fluxing oil-containing bitumen emulsion, said emulsion comprising from 50 to 90% by weight of bitumen and from 1 to 50% by weight of a fluxing oil, together with a fatty amine- or organic silicon-based adhesion-promoting agent. The fluxing oil may be a vegetable oil such as rapeseed oil, a derivative thereof such as its fatty acid part, a combination of fatty acids, a transesterification product like a rapeseed oil methyl ester or a rapeseed oil alkyd resin derivative.

The French patent application FR 2 770 850 (ELF ANTAR FRANCE) describes a bitumen composition comprising a vegetable oil derived additive. Said additive is a residue from the distillation of such oil or a product resulting from transesterification of said oil with a $C_1$ to $C_6$ alkanol.

However, fatty substances of natural origin used in these applications do not possess a sufficient drying ability to succeed in polymerizing sufficiently rapidly with no catalyst, which does result in excessively soft binders which sometimes get rapidly damaged when prematurely whishing to put the road way back into service. To counteract these drawbacks, some patents recommend to add catalysts comprising metal salts, but those are to be avoided to respect the environment The French patent application FR 2 768 150 (SAADA) describes a bitumen binder comprising a fluxing oil selected from fatty acid esters, obtained in particular by vegetable oil transesterification, and preferably a fluxing oil polymerization catalyst. The oils used are methyl esters of rapeseed, linseed or sunflower seed oils, having optionally been previously isomerized.

The isomerization treatment objective is to increase the number of conjugated C=C double bonds, which results in an increase in the drying power.

The conjugated double bonds of the fluxing oil reduce its initial viscosity and play a major role in the binder hardening. Indeed, after spreading, the binder hardening does occur upon crosslinking of the fluxing oil in the presence of the air oxygen and the catalyst (transition metal salts). The metal salts form peroxide —O—O— bridges on the fatty acid unsaturated chains. Such bridges are unstable and lead to the formation of free radicals, which attack other chains, thus producing through propagation a polymerization-crosslinking of the esters.

The French patent application FR 2701021 (SCREG) describes an emulsion comprising a hydrocarbon binder, especially a bitumen, and at least one natural or synthetic, drying oil or semi-drying oil, or at least one stand oil of such an oil and in general one catalyst of the transition metal type used as an accelerating agent, i.e. manganese naphthenate.

Only the European applications EP 1 482 012 and EP 0 4075 882.3 (LATEXFALT B.V.) describe fluxed bituminous binders that do not require to use polymerization catalysts of the transition metal type in order to crosslink the fluxing oil. These binders comprise, in addition to bitumen, an unsaturated fatty acid $C_1$-$C_4$ alkyl ester used as a fluxing oil, an elastomer, a hardening agent to promote the elastomer crosslinking and optionally an amide-type additive intended to further reduce the viscosity of the fluxed bitumen and to increase the softening temperature of the composition.

SUMMARY OF THE INVENTION

It is therefore an object of the present invention to provide for a chemical modification of fatty substances of natural origin, so as to obtain renewable and non toxic fluxing oil having the following properties:
- on the one hand good solvent power to facilitate the bitumen dissolution when preparing binders and to facilitate the implementation of such binders,
- on the other hand a good reactivity so as to polymerize together with the bitumen after implementation, so as to provide the bitumen with its use properties, without emitting volatile organic compounds.

It is also an object of the present invention to provide for the preparation of a fluxing oil such as defined, having a suitable drying ability and an adapted viscosity so as to enable the combination of the fatty substances of natural origin contained therein with the bitumen.

It is a further object of the present invention to provide a fluxing oil such as defined, the fatty substances of natural origin of which do have chemical functions that might react with chemical functions present in the bitumen and/or with chemical functions of other molecules in the fluxing oil, thus enabling their crosslinking by removing or at the very least by limiting the use of metal catalysts, or enabling if applicable the use of organic catalysts that are not harmful for the environment.

DETAILED DESCRIPTION OF THE INVENTION

The applicants discovered that it is possible to aim at the hereabove mentioned objectives by using a bitumen fluxed with a fluxing oil based on fatty acid alkyl monoesters of natural origin having been chemically functionalized by oxidation.

Therefore, the first object of the present invention is a method for preparing a fluxing oil, having an iodine index ranging from 50 to 200, preferably higher than 80, based on fatty substances of natural origin having been chemically functionalized by oxidation, including the steps of:

i) providing a fatty substance or a mixture of fatty substances of natural origin comprising at least one compound selected from triglycerides, diglycerides and monoglycerides, ii) subjecting said fatty substance or mixture of fatty substances of natural origin to at least one transesterification reaction with at least one alkanol, iii) subjecting the compound or mixture of compounds obtained at step ii) to at least one chemical functionalization reaction by oxidation introducing at least one functional group selected from carboxylic acid, epoxy, peroxide, aldehyde, ether, ester, alcohol and ketone groups, and iv) collecting the fluxing oil.

The second object of the present invention is a method for preparing a fluxing oil, having an iodine index ranging from 50 to 200, preferably higher than 80, based on fatty substances of natural origin having been chemically functionalized by oxidation, including the steps of:

i) providing a fatty substance or a mixture of fatty substances of natural origin comprising a fatty acid or a mixture of fatty acids, ii) subjecting said fatty substance or said mixture of fatty substances of natural origin to at least one esterification reaction with at least one alkanol, iii) subjecting the compound or mixture of compounds obtained at step ii) to at least one chemical functionalization reaction by oxidation introducing at least one functional group selected from carboxylic acid, epoxy, peroxide, aldehyde, ether, ester, alcohol and ketone groups, and iv) collecting the fluxing oil.

As used herein, "fatty substances of natural origin" are intended to mean naturally occurring fatty substances or derivatives thereof.

According to the methods of the invention, preparing fluxing oils with the expected properties does involve two chemical steps: a first step of transesterification (first method) or esterification (second method) followed with an oxidation step which both methods have in common. The transesterification and esterification steps will be first described in this order.

So as to be used in the first method of the invention (transesterification), fatty substances of natural origin should comprise at least one compound selected from triglycerides, diglycerides and monoglycerides. They preferably comprise at least one triglyceride. More preferably, fatty substances of natural origin used in the first method of the invention do comprise an amount of compounds selected from triglycerides, diglycerides and monoglycerides higher than 30% by weight, more preferably higher than 70% by weight, relative to the fatty substances of natural origin weight.

Of course, these fatty substances of natural origin may contain other esters suitable for undergoing the transesterification reaction than glycerides.

Fatty substances of natural origin to be suitably used in step i) of the first method of the invention are selected from oils found in nature or derivatives thereof, fats found in nature or derivatives thereof, and mixtures thereof, for example animal and/or vegetable oils and fats, preferably vegetable oils and animal fatty substances (such as tallow or lanolin), more preferably vegetable oils. These fatty substances of natural origin may especially be derived from used vegetable oils originating from agri-food industry, for example frying oils, preservative oils, provided that they have a natural origin.

Excluded from the context of the invention are therefore synthetic oils and fats, as well as fossil oils and fats, which are not renewable and thus are devoid of interest in a perspective of sustainable development.

Preferably, vegetable oils will be used such as sunflower seed oil, rapeseed oil, peanut oil, coconut oil, linseed oil, soybean oil, olive oil, castor oil, corn oil, pumpkin seed oil, safflower seed oil, poppyseed oil, grape seed oil, jojoba oil, sesame oil, walnut oil, hazelnut oil, China wood oil, their derivatives, as well as their mixtures. The particularly preferred oils include linseed oil, soybean oil, sunflower seed oil, corn oil, rapeseed oil and peanut oil.

Polyunsaturated fatty substances chain-rich oils fats will be preferred, especially oils or fats with a high iodine index, preferably equal to or higher than 70, more preferably equal to or higher than 120, like linseed oil (strongly drying oil), walnut oil, soybean oil, as well as some sunflower seed and corn oils (semi-drying oils).

The transesterification step ii) of the first method of the invention does produce fatty acid monoesters from the glycerides and glycerol as a by-product. It is performed under conditions that are well known to those skilled in the art, in the presence of at least one alkanol and typically one basic catalyst.

In the context of the present invention, "fatty acids" are intended to mean $C_4$-$C_{28}$ saturated, mono-unsaturated or poly-unsaturated, linear or branched, cyclic or acyclic, mono, di or tricarboxylic aliphatic acids.

A description of the conditions for the transesterification step will be found in the following general literature: *Bailey's Industrial Oil and Fatty substance Products*, $6^{th}$ Edition (2005), Fereidoon Shahidi Ed., John Wiley & Sons, Inc., and *March's Advanced Organic Chemistry: Reactions, Mechanisms, and Structure*, $5^{th}$ Edition (2001), M. B. Smith, J. March, Wiley-Interscience.

In general, a basic catalyst is used and heating is effected to a temperature ranging from 40 to 100° C. Non limitative examples of basic catalysts include NaOH, KOH and alkaline alkoxides such as a lithium, sodium or potassium methoxide, ethoxide, n-propoxyde, i-propoxide, n-butoxide, i-butoxide and t-butoxide, especially potassium methoxide, sodium methoxide, potassium ethoxide and sodium ethoxide.

Said alkanol is preferably an aliphatic, linear or branched mono-alcohol, preferably a $C_1$-$C_6$ mono-alcohol, more preferably a $C_1$-$C_4$ mono-alcohol. Suitable examples of alkanols to be used include methanol, ethanol, n-propanol, i-propanol, n-butanol, t-butanol and i-butanol. Methanol or ethanol will be preferably used.

Several successive transesterification reactions may be conducted.

Depending on the operating procedure, triglycerides and/or partial glycerides may be obtained in admixture with alkyl monoesters. The mixture resulting from the transesterification step ii) may however include contents of mono, di or triglycerides. All these glycerides do typically represent less than 5% by weight of said mixture total weight, preferably less than 3%.

The mixture resulting from the transesterification step ii) is then submitted to a chemical functionalization reaction by oxidation, which produces the fluxing oil of the invention.

The esterification step of the second method of the invention will be described hereafter.

So as to be suitably used in the second method of the invention (esterification), fatty substances of natural origin should include a fatty acid or a mixture of fatty acids. Fatty substances of natural origin used in the second method of the invention comprise an amount of fatty acid higher than 30% by weight, preferably higher than 70% by weight, more preferably higher than 80% by weight and even more preferably higher than 90% by weight relative to the weight of fatty substances of natural origin.

Of course, fatty substances of natural origin may contain acids suitable for undergoing the esterification reaction other than fatty acids.

Any source of fatty acids of natural origin (renewable) may be used in step i) of the second method of the invention Tall oil or a derivative thereof will be preferably used. Tall oil is a waste resulting from papermaking pulp. This strongly drying oil is composed of a mixture of free fatty acids (oleic, linoleic, linoleic acids . . . ), resinic acids and unsaponifiable matters.

Tall oils or tall oil derivatives with an iodine index higher than or equal to 150, more preferably higher than or equal to 160 will be preferred.

Fatty acids may also result from hydrolyzing mono, di or triglycerides.

The esterification step ii) of the second method of the invention produces fatty acid monoesters from fatty acids and water as a by-product. It is performed under conditions that are well known to those skilled in the art, in the presence of at least one alkanol, preferably a mono-alcohol.

A description of the conditions for this step will be found in the following general literature: *Bailey's Industrial Oil and Fatty substance Products*, 6$^{th}$ Edition (2005), Fereidoon Shahidi Ed., John Wiley & Sons, Inc., and *March's Advanced Organic Chemistry: Reactions, Mechanisms, and Structure*, 5$^{th}$ Edition (2001), M. B. Smith, J. March, Wiley-Interscience.

In general, an acid catalyst is used and heating is effected to a temperature ranging from 60 to 160° C. Non limiting examples of acid catalysts include sulfuric acid and p-toluene sulfonic acid (PTSA).

Said alkanol is preferably an aliphatic, linear or branched mono-alcohol, preferably a $C_1$-$C_6$ mono-alcohol, more preferably a $C_1$-$C_4$ mono-alcohol. Suitable examples of alkanols to be used include methanol, ethanol, n-propanol, i-propanol, n-butanol, t-butanol and i-butanol. Methanol or ethanol will be preferably used.

Several successive esterification reactions may be performed.

The mixture resulting from the esterification step ii) is then submitted to a chemical functionalization reaction by oxidation, which produces the fluxing oil of the invention.

The esterification and transesterification reactions, as a consequence, do provide a less viscous mixture that has a higher solvency as compared to the initial fatty substance or fatty substance mixture of natural origin.

The step of chemical functionalization by oxidation is a step which both methods of the invention have in common. It is conducted on the compound or the mixture of compounds resulting from step ii), which thus contain at least one fatty acid alkyl monoester. Several successive oxidation reactions that are the same or different may be conducted.

It should be noted that any fatty substance or mixture of fatty substances of natural origin comprising at least one fatty acid alkyl monoester may also be submitted to a step of chemical functionalization by oxidation to produce a fluxing oil according to the invention.

Fluxing oils obtained according to the methods of the invention contain fatty acid monoesters having a natural origin functionalized by chemical oxidation, i.e. in the context of the present invention fatty acid monoesters having a natural origin that are modified by at least one functional group selected from carboxylic acid, epoxy, peroxide, aldehyde, ether, ester, alcohol and ketone groups. An ether function does here correspond to the ether-oxide function.

The oxidation reactions conducted on fatty substances of natural origin having been submitted to an esterification or a transesterification do generally lead to introducing several different chemical functions.

These oxygen-containing functional groups might react with chemical functions present in the bitumen, for example acid or alcohol-type functions. These oxygen-containing functional groups might also react with the oxygen of the air and/or with the chemical functions of other molecules in the fluxing oil. As a result, the fluxing oil hardening process is activated within the fluxed bitumen upon spreading onto a surface, especially a road surface.

The fatty substances of natural origin treated with the methods of the invention are said to be activated because of their improved compatibility with bitumen and their stronger reactivity against the same.

The chemical functionalization by oxidation is in particular effected on the fatty substance hydrocarbon fatty chains of natural origin, resulting from step ii), especially on their C═C double bonds. The fatty substance chains of fatty acid aliphatic monoesters resulting from the esterification or transesterification reaction are especially involved, but typically other compounds as well, that are present in the mixture resulting from step ii) of the methods of the invention.

According to an embodiment of the invention, fatty substances of natural origin provided during step i) comprise carbon-carbon double bonds at least 15% of which, preferably at least 20% of which are oxidized during step iii).

Because the oxidation is only partial, the methods of the invention do provide fluxing oils the components of which still have C═C double bonds, so as to maintain a sufficient drying ability, which is indicated by its iodine index (for example, at least 80 g of $I_2$/100 g for rapeseed methyl esters). The oxidation is interrupted as soon as the fluxing oil has attained the expected iodine index value, as measured according to the ISO 3961 standard.

The partial oxidation step may cause a polymerization reaction or an ester oligomerization reaction to begin, and cause for example a dimerization and/or a cyclization reaction of the hydrocarbon chains mediated through the oxygen of the air. Thus, carbon-oxygen-carbon bridges may be formed between molecules in the fluxing oil.

The peroxide functions grafted during step iii) may take part to bond forming reactions with other molecules of the mixture, especially with bitumen.

Thus, oxygen atoms are already grafted onto the fluxing oil molecules and may take part to the formation of oxygen bridges between the fluxing oil and/or other molecules of the mixture.

For non oxidized fluxing oil hydrocarbon chains, these oxygen bridges are created from the air oxygen which has to be grafted onto two molecules, which makes more difficult to form such bridges at low temperature (<60° C.).

The reactants that are used for the chemical functionalization by oxidation include for example the air oxygen or pure oxygen or hydrogen peroxide under various temperature, pressure and reaction time conditions, optionally in the presence of catalysts. In the presence of oxygen, heating to a temperature of from 120 to 250° C. is generally effected.

Means may be implemented to monitor the oxidation reactant consumption during step iii) of the method.

The various functionalization reactions implemented belong to usual reactions in organic chemistry, that are described for example in *Bailey's Industrial Oil and Fatty substance Products*, $6^{th}$ Edition (2005), Fereidoon Shahidi Ed., John Wiley & Sons, Inc.

In general, fluxing oils obtained with the methods of the invention have following characteristics:
- a kinematic viscosity ranging from 4 to 10 $mm^2/s$ at 40° C.,
- an acid number according to NF T 60-204 standard higher than 5, more preferably higher than 10 mg KOH/g,
- a saponification number according to ISO 3657 standard ranging from 150 to 250 mg KOH/g,
- a peroxide number according to NF T 60-220 standard of less than 10, more preferably of less than 5 meq of $O_2$/kg.

The present invention also relates to the use of a fluxing oil such as prepared using one of the methods of the invention, as a fluxing oil for bituminous binder, which is mainly intended to be used for road works or civil engineering.

The present invention also relates to a hydrocarbon binder for making road surface layers and/or road pavements and/or for civil engineering applications, comprising at least one bitumen and at least one fluxing oil as prepared using one of the methods of the invention.

The fact that many chemical functions are present on the fluxing oil molecules such as C=C double bonds (iodine index ranging from 50 to 200 g of $I_2$/100 g), carboxylic acid, epoxy, peroxide, aldehyde, ether, ester, alcohol and/or ketone functional groups makes it possible to obtain a good combination of the fluxing oil of the invention with the bitumen.

The bitumen used in the present invention is a mixture of hydrocarbon-based substances having a natural origin derived from the heavy fraction retrieved when distilling petroleum, or extracted from natural deposits in a solid or a liquid form, with a density ranging from 0.8 to 1.2. Also included in bitumens in the context of the invention are bitumens of vegetable origin such as Végécol® marketed by the Colas company, described in the French patent application FR 2 853 647, bitumens modified by addition of additives of any nature such as additives to improve the adhesion characteristics, and to artificially impart the properties required for the cationic emulsification, by incorporating elastomers, as a rubber powder or otherwise, or also bitumens improved by adding polymers of various types; this list being not limitative.

The binders of the invention typically comprise from 0.1 to 30% of fluxing oil, preferably from 0.5 to 10% by weight, relative to the binder total weight.

Preferably, the hydrocarbon binder of the invention does not comprise fluxing oils other than those based on fatty substances of natural origin functionalized by oxidation according to the methods of the invention.

The present invention further relates to a material for making road surface layers and/or road pavements and/or for civil engineering applications comprising a hydrocarbon binder such as defined hereabove, that is to say a binder comprising at least one bitumen and at least one fluxing oil as prepared using one of the methods of the invention.

The material of the invention may further comprise an aggregate. If not, it may be used for making tack coats based on fluxed bitumen or emulsion, or for making cleaning products or to prevent dirt from depositing onto building machines.

The following, non limitative examples illustrate the present invention.

EXAMPLES

1. Preparation of a Catalytic Solution of Potassium Methoxide to be Used During Transesterification Reaction 323.5 g KOH (purity: 85%) were dissolved in 2.75 kg of absolute methanol (purity >99%) in a 5 liter capacity double-jacket reactor under inert atmosphere (nitrogen) and fitted with a refluxing condenser. The dissolution reaction is strongly exothermic.

The catalytic solution was then cooled to 30° C. then stored under nitrogen atmosphere in a 5 L-capacity calibrated polypropylene can.

Using an inert atmosphere prevents any carbonation, and hydrolysis reaction of the formed alcoxide.

2. Preparation of Rapeseed Methyl Esters by Rapeseed Oil Transesterification

Operating procedure: 50 kg of refined rapeseed oil (acid number ≦1 mg KOH/g) and 9.75 kg of methanol were introduced at room temperature by pumping into a R100 Inox reactor fitted with a refluxing condenser. The reactor was set under inert atmosphere (nitrogen) and the reaction mixture left under moderate and efficient stirring, then was heated up to 65-70° C. so as to obtain a total refluxing, under inert atmosphere. The entire catalytic solution prepared as described above was introduced in three steps as follows into the stirred reactor: 70% of the catalytic solution volume was rapidly injected, then 15% of the catalytic solution volume was rapidly injected after 10 mn reaction, then the remainder of the catalytic solution volume (15%) was rapidly injected 10 minutes later. Stirring the reaction mixture was then continued for 30 to 40 additional minutes at 70-75° C., while controlling that the temperature did not exceed 75° C. The pH value of the reaction mixture was measured. The catalysis phase total duration did typically range from 60 to 80 minutes.

Analysis: the prepared methyl esters may be qualitatively evaluated as follows.

50 mL of the reaction mixture present in the R100 reactor were collected in a 125 mL capacity flask. The glycerol was allowed to decant. 2.5 mL of the "ester phase" were collected in a 10 mL test tube, to which were then added 2.5 mL of diethyl ether. This organic phase was washed three times using 2.5 mL of demineralized water. The washing water was separated using a pipette, and the ester-containing washed organic phase was dried on $Na_2SO_4$. The diethyl ether was evaporated by cold concentrating under nitrogen flow. 30 mg of the resulting methyl ester mixture (washed and dried) were introduced into a 20 mL vial, completed with analytic methanol. This solution was injected in HPLC. The ester purity was higher than 96%.

Treatment: The reaction mixture was then cooled to 60-65° C., and stirring was stopped. Then, the reaction mixture was submitted to a static decantation for 30 minutes at this temperature in order to separate the glycerol. A colour difference between the glycerol (darker) and the methyl ester phase (very pale) could be observed. The interface between the two phases was very distinct. From 9 kg to 9.5 kg of the formed glycerol were drawn off through the bottom of the reactor. The drawing off was conducted in two steps a) a quick drawing off corresponding to about 90% of the estimated amount, i.e. around 8.25 kg; b) a much slower drawing off to promote as much as possible the removal of the glycerol. Because of its high viscosity, the latter tended to adhere onto the walls and thus took some time to get fully concentrated in the bottom portion of the reactor. Washing the "ester phase" was performed in the reactor R100 as follows. A first washing was performed by introducing into the reactor 3% by weight of demineralized water as related to the weight of the involved rapeseed oil, that is to say 1.5 kg. Using demineralized water did prevent any calcium salt formation. The mixture was stirred for 5 minutes at 60-65° C., the stirring was stopped and the mixture allowed to decant for 20 minutes. The lower phase (from 3 kg to 3.5 kg of a mixture composed of water, methanol, glycerol and potash soaps) was drawn off. The pH value of the washing water was measured. A second washing was performed by introducing into the reactor 3% by weight of demineralized water as related to the weight of the involved rapeseed oil, that is to say 1.5 kg. The mixture was stirred for 10 minutes at 60-65° C., the stirring was then stopped and the mixture allowed to decant for 30 minutes. The lower phase (from 3 kg to 3.5 kg of a mixture composed of water, methanol, glycerol and potash soaps) was drawn off. The pH value of the washing water was measured.

The reaction mixture was rapidly dried in the reactor R100 so as to avoid any hydrolysis and oxidation phenomenon, as follows. The reaction mixture was heated under dynamic vacuum conditions (<10 mm Hg) and under stirring at a temperature ranging from 110 to 125° C. to remove both the water traces and about 0.5 to 1% of residual methanol. These conditions were maintained for 30 to 60 minutes up to the end of the product ebullition or until a water dosage did provide a result <200 ppm.

The recovered ester mixture was sufficiently pure, as measured by HPLC or gas chromatography, to be involved in the oxidation step. It was unnecessary to totally remove potassium ions as esters were treated by means of a molecular distillation.

The ester mixture was stored in 30 L or 5 L capacity cans in opaque polypropylene under nitrogen atmosphere so as to avoid any oxidation reaction.

The physico-chemical properties of the mixture of rapeseed methyl esters obtained are given in Table 1.

TABLE 1

| Characteristic | Measuring method | Unit | Value |
| --- | --- | --- | --- |
| Kinematic viscosity at 40° C. | ISO 3104 | mm$^2$/s | 4.5 |
| Iodine number | NF ISO 3961 | g I$_2$/100 g | 120 |
| Acid number | NF T 60-204 | mg KOH/g | 0.3 |
| Saponification number | NF ISO 3657 | mg KOH/g | 195 |
| Peroxide number | NF T 60-220 | Meq O$_2$/kg | 3 |
| Fatty acid composition (gas chromatography) | | | |
| Palmitic acid C16:0 | | | 5.96% |
| Stearic acid C18:0 | | | 1.55% |
| Oleic acid C18:1 | | | 64.45% |
| Linoleic acid C18:2 | | | 19.64% |
| Alpha linolenic acid C18:3 | | | 7.61% |
| Arachidic acid C20:0 | | | 0.19% |
| Eicosenoic acid C20:1 | | | — |
| Behenic acid C22:0 | | | 0.79% |

3. Partial Oxidation of Rapeseed Methyl Esters

Operating procedure: 175 kg of rapeseed methyl esters as obtained hereabove were introduced at room temperature into a 300 liter capacity double-jacket reactor. Pure oxygen was introduced into the reactor under 5 bars, then the reactor temperature was increased to 150° C. under stirring. The oxygen consumption was monitored during the reaction. After 40 hours, the reaction mixture was cooled, then drawn off (example 3.1). The procedure was repeated on a same rapeseed methyl ester batch so as to check the reproducibility of the oxidation reaction (example 3.2).

The physico-chemical properties of the fluxing oils obtained are given in Table 2.

TABLE 2

| Characteristic | Measuring method | Unit | Example 3.1 | Example 3.2 |
| --- | --- | --- | --- | --- |
| Kinematic viscosity at 40° C. | ISO 3104 | Mm$^2$/s | 8.86 | 8.77 |
| Iodine index | NF ISO 3961 | g I$_2$/100 g | 81.2 | 81.6 |
| Acid index | NF T 60-204 | mg KOH/g | 13.6 | 13.3 |
| Saponification number | NF ISO 3657 | mg KOH/g | 195.5 | 194.3 |
| Peroxide index | NF T 60-220 | Meq O$_2$/kg | 3.3 | 3.0 |
| Fatty acid and oxidized fatty acid composition determined by gas chromatography (%) | | | | |
| | | | Example 3.1 | Example 3.2 |
| Palmitic acid C16:0 | | | 4.4 | 46 |
| Stearic acid C18:0 | | | 1.2 | 1.3 |
| Oleic acid C18:1 | | | 37.8 | 35.8 |
| Linoleic acid C18:2 | | | 8.0 | 8.2 |
| Alpha linolenic acid C18:3 | | | 1.7 | 1.8 |
| Arachidic acid C20:0 | | | 0.6 | 0.6 |
| Eicosenoic acid C20:1 | | | — | — |
| Behenic acid C22:0 | | | — | — |
| Oxidized fatty acids (%) | | | 46.4 | 45.4 |

As demonstrated in the examples, the chemical functionalization by oxidation of fatty substances of natural origin according to the method of the invention may be conducted with a good reproducibility.

The obtained fluxing oils have the advantage not to evaporate in the atmosphere but to harden quickly in the bitumen once the bituminous binder has been spread onto a surface.

The invention claimed is:

1. A method for preparing a fluxing oil based on fatty substances having a natural origin and having been chemically functionalized by oxidation, including the steps of:
   i) providing a fatty substance or a mixture of fatty substances of natural origin comprising at least one compound selected from triglycerides, diglycerides and monoglycerides,
   ii) subjecting said fatty substance or mixture of fatty substances of natural origin to at least one transesterification reaction with at least one alkanol,
   iii) subjecting the compound or mixture of compounds obtained at step ii) to at least one chemical functionalization reaction by oxidation, and
   iv) collecting the fluxing oil,
   wherein said chemical functionalization introduces at least one functional group selected from carboxylic acid, epoxy, peroxide, aldehyde, ether, ester, alcohol and ketone groups, the fluxing oil collected at step iv) has an iodine number ranging from 50 to 200, and said fatty substance(s) of natural origin comprise(s) carbon-carbon double bonds, at least 15% of which are oxidized during step iii).

2. The method according to claim 1, wherein said alkanol is selected from the group consisting of methanol, ethanol, n-propanol, i-propanol, n-butanol, t-butanol and i-butanol.

3. The method according to claim 1, wherein said fatty substances of natural origin comprise carbon-carbon double bonds, at least 20% of which, are oxidized during step iii).

4. The method according to claim 1, wherein said fatty substances of natural origin are selected from oils found in nature or derivatives thereof, fats found in nature, used vegetable oils originating from agri-food industry, and mixtures thereof.

5. The method according to claim 1, wherein said fatty substances of natural origin are selected from animal oils, vegetable oils or fats.

6. The method according to claim 5, wherein the vegetable oils are selected from the group consisting of sunflower seed oil, rapeseed oil, peanut oil, coconut oil, linseed oil, soybean oil, olive oil, castor oil, corn oil, pumpkin seed oil, safflower seed oil, poppyseed oil, grape seed oil, jojoba oil, sesame oil, walnut oil, hazelnut oil, China wood oil, as well as and their mixtures.

7. The method according to claim 5, wherein said oils or fats have an iodine number higher than or equal to 70.

8. The method according to claim 1, wherein the fluxing oil collected at step iv) has an iodine number higher than 80.

9. A hydrocarbon binder for making road surface layers and/or road pavements and/or for civil engineering applications, which comprises at least one bitumen and at least one fluxing oil prepared with the method according to claim 1.

10. The binder according to claim 9, which comprises from 0.1 to 30% by weight of fluxing oil relative to the binder total weight.

11. A material for making road surface layers and/or road pavements and/or for civil engineering applications, which comprises a hydrocarbon binder comprising at least one bitumen and at least one fluxing oil prepared with the method according to claim 1.

12. The material according to claim 11, further defined as comprising an aggregate.

13. The method of claim 1, wherein said chemical functionalization introduces at least one functional group selected from the group consisting of carboxylic acid, epoxy, ether, ester, and alcohol groups.

14. The method of claim 1, wherein said at least one chemical functionalization reaction by oxidation is performed using pure oxygen or hydrogen peroxide.

15. A method for preparing a fluxing oil based on fatty substances having a natural origin and having been chemically functionalized by oxidation, including the steps of:
   i) providing a fatty substance or a mixture of fatty substances having a natural origin comprising a fatty acid or a mixture of fatty acids,
   ii) subjecting said fatty substance or said mixture of fatty substances of natural origin to at least one esterification reaction with at least one alkanol,
   iii) subjecting the compound or mixture of compounds obtained at step ii) to at least one chemical functionalization reaction by oxidation, and
   iv) collecting the fluxing oil,
   wherein said chemical functionalization introduces at least one functional group selected from carboxylic acid, epoxy, peroxide, aldehyde, ether, ester, alcohol and ketone groups, the fluxing oil collected at step iv) has an iodine number ranging from 50 to 200, and said fatty substance(s) of natural origin comprise(s) carbon-carbon double bonds, at least 15% of which are oxidized during step iii).

16. The method according to claim 15, wherein said fatty substances of natural origin comprise tall oil.

17. The method according to claim 16, wherein the tall oil has an iodine number higher than or equal to 150.

18. The method of claim 15, wherein said chemical functionalization introduces at least one functional group selected from the group consisting of carboxylic acid, epoxy, ether, ester, and alcohol groups.

19. The method of claim 15, wherein said at least one chemical functionalization reaction by oxidation is performed using pure oxygen or hydrogen peroxide.

20. A hydrocarbon binder for making road surface layers and/or road pavements and/or for civil engineering applications, which comprises at least one bitumen and at least one fluxing oil prepared with the method according to claim 15.

21. A material for making road surface layers and/or road pavements and/or for civil engineering applications, which comprises a hydrocarbon binder comprising at least one bitumen and at least one fluxing oil prepared with the method according to claim 15.

* * * * *